Patented Nov. 21, 1944

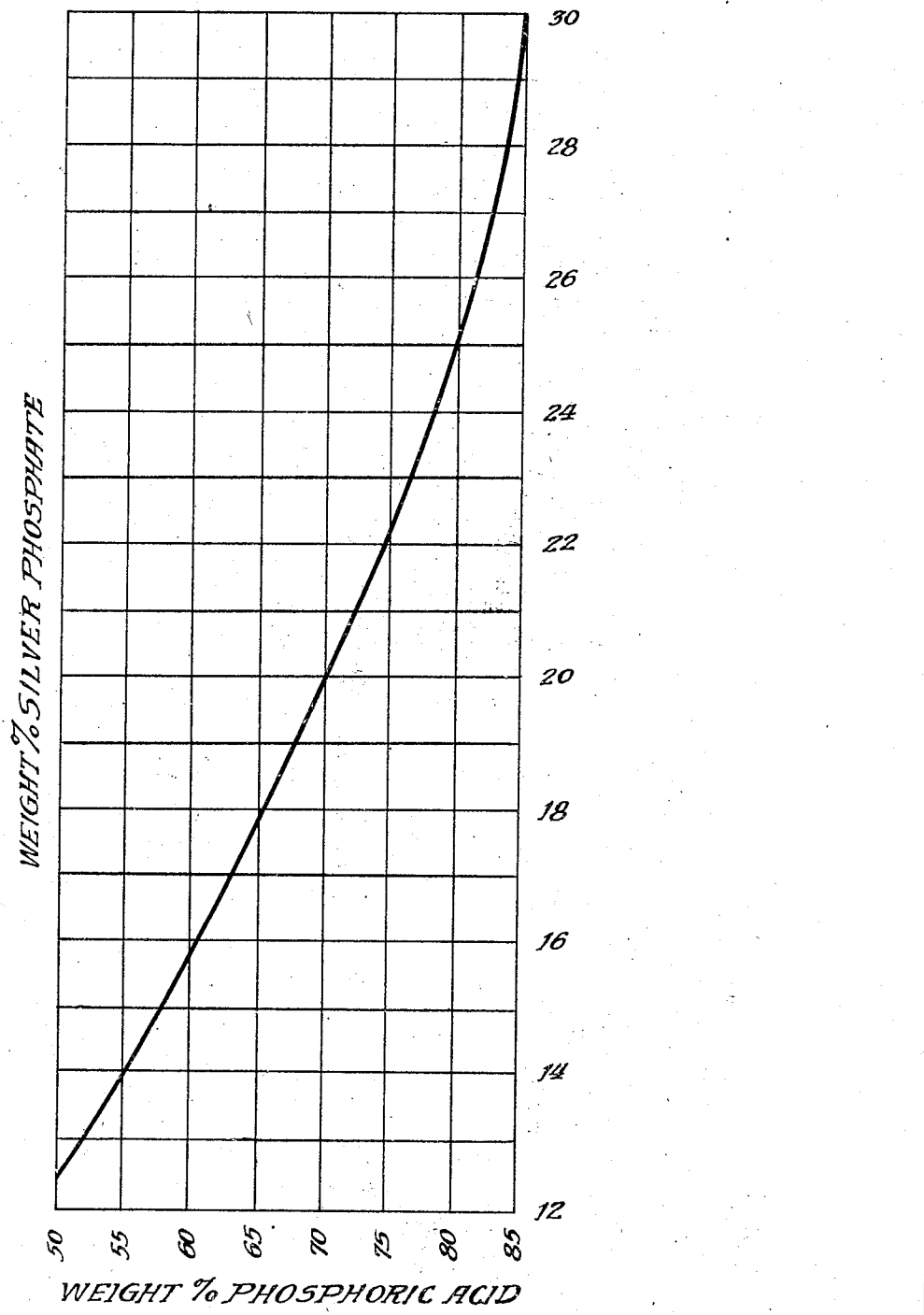

2,363,309

UNITED STATES PATENT OFFICE 2,363,309

PROCESS FOR THE SEPARATION OF AN UNSATURATED HYDROCARBON FROM A MIXTURE CONTAINING THE SAME

Bernard S. Friedman and Russell F. Stedman, Chicago, Ill., assignors to Universal Oil Products Company, Chicago, Ill., a corporation of Delaware Application September 28, 1942, Serial No. 459,940

16 Claims. (Cl. 260—677)

This invention relates broadly to the separation of organic mixtures which contain unsaturated and less unsaturated compounds and is particularly applicable to the treatment of hydrocarbon mixtures for the separation of unsaturated from less unsaturated hydrocarbons.

The hydrocarbon mixtures which may be treated in the present invention comprise normally gaseous hydrocarbons, normally liquid hydrocarbons or both normally gaseous and normally liquid hydrocarbons. In one embodiment, the invention may be utilized for the separation of, for example, butylenes from butane or for the separation of any particular olefinic compound from its corresponding paraffinic compound. Similarly, the invention may be utilized for the separation of butadiene from butylenes and/or butanes, or of any diolefinic hydrocarbon from its corresponding mono-olefinic and/or paraffinic hydrocarbon, as well as for the separation of polyolefinic hydrocarbons. Also, the invention may be utilized for the separation of styrene from ethylbenzene or for the separation of any aromatic hydrocarbon containing an unsaturated side chain from its corresponding aromatic hydrocarbon containing a saturated side chain. It is understood that the results obtained by the treatment of these various mixtures will not necessarily be equivalent.

In still another modification, the invention may be utilized for the separation of mixtures of olefinic hydrocarbons from mixtures of paraffinic hydrocarbons, such as the removal of olefinic hydrocarbons from a gasoline or other distillate containing the same, in order to leave a paraffinic product which, in the case of gasoline, will comprise a distillate which is particularly suitable for use in aviation fuel. Another application of the present process is in the purification of various hydrocarbon fractions. For example, in the isomerization of paraffinic hydrocarbons it has been found that the presence of substantial amounts of olefins is undesirable when employing metal halide catalysts, and the process of the present invention may be utilized as a means of removing the olefinic hydrocarbons from the paraffinic fraction.

In still another modification, the features of the present invention may be utilized for the separation of branched chain olefinic hydrocarbons from straight chain olefinic hydrocarbons, as well as for the separation of the lower homologs of olefinic hydrocarbons from the higher homologs thereof. In the first class mentioned above, isobutylene, for example, may be separated from mixtures containing the same and normal butylene. In the treatment of mixtures of isobutylene, normal butylene, and butanes in accordance with the present invention, a greater portion of the isobutylene is hydrated to form tertiary butyl alcohol, which may subsequently be separated from the other constituents. In the second class, hexenes may be separated, for example, by virtue of preferential solubility from heptenes and higher boiling olefins. In case these latter compounds are present in admixture with paraffins of both 4 and 5 carbon atoms to the molecule, their separation cannot readily be accomplished by purely fractionation means.

It is understood that the invention is not limited to the treatment of the hydrocarbon compounds as mixtures listed above but that these represent examples of some of the types of compounds which may be treated according to the present invention. The invention is applicable to the treatment of any mixture which contains unsaturated and less unsaturated compounds.

The charging stock is preferably given a preliminary treatment to remove any sulfur compounds which may be contained therein, in order to avoid any deleterious effects which the sulfur may exert on the separating agent of the present invention. This preliminary treatment may comprise, for example, a caustic wash to remove hydrogen sulfide and/or a more severe treatment to remove other sulfur compounds.

The present invention is characterized by a novel separating agent, which broadly comprises a solution of a silver salt in an acid of phosphorus and more particularly comprises a phosphoric acid solution of silver phosphate. We have discovered that the separating agent of the present invention is exceptionally effective in accomplishing the separation of unsaturated from less unsaturated compounds. The type of separating agent herein disclosed has a high capacity, that is, it will dissolve large proportions of the desired compounds, and, in addition, it has a high selectivity, that is, it will dissolve the unsaturated compounds preferentially to the less unsaturated compounds. Further, the preferred separating agent of the present invention will not form explosive acetylides or explosive fulminates. Also, the preferred separating agent of the present invention is immiscible in hydrocarbons, and therefore the hydrocarbons may readily be recovered from the separating agent in the subsequent stages of the process.

In one embodiment, the present invention relates to a process for the separation of unsaturated compounds from less unsaturated compounds which comprises contacting a mixture containing unsaturated compounds with a separating agent comprising a solution of a silver salt in an acid of phosphorus, separating an extract layer and a raffinate layer, and separately withdrawing said extract and raffinate layers.

In another specific embodiment, the invention relates to a process for the separation of unsaturated hydrocarbons from less unsaturated hydrocarbons which comprises contacting a mixture containing unsaturated and less unsaturated hydrocarbons with a separating agent comprising a solution of silver phosphate in phosphoric acid, separating an extract layer and a raffinate layer, and separately withdrawing said extract and raffinate layers.

It is understood that the results obtained by the use of the various acids of phosphorus or of the various salts of silver, as well as by the different concentrations of both the acid and the salt, will not necessarily be equivalent.

Our experiments have indicated that best results are obtained when employing high concentrations of the silver salt. However, the concentration of the silver salt which may be utilized in the separating agent is limited by the concentration of the acid of phosphorus. On the other hand, the concentration of the acid of phosphorus is limited since the undiluted acids are too viscous and also since the undiluted acids tend to catalyze undesired reactions. Thus, for example, it has been found that phosphoric acid solutions of greater than 95% concentration are too viscous for practical use at ordinary temperatures. Therefore, according to the present invention, the phosphoric acid solution should be below 95% concentration and preferably below 90% concentration.

Effective separating agents have been prepared comprising 30% silver phosphate in phosphoric acid of 85% concentration. When it is desired to reduce the concentration of the phosphoric acid as, for example, when undesired reactions occur if higher temperatures are to be utilized in the subsequent stages of the process to recover the hydrocarbons from the separating agent, the concentration of silver phosphate will accordingly be reduced. Effective separating agents have also been prepared comprising 18% silver phosphate in phosphoric acid of 67.5% concentration. Thus, it is preferred to utilize as high a concentration of the acid as is satisfactory in connection with the particular separation desired and also to utilize as high a concentration of the silver salt as may be dissolved therein. However, it is understood that lower concentrations may be utilized within the scope of the present invention but not necessarily with equivalent results, but in most cases the concentration of acid should be above 50%.

The accompanying drawing is a curve showing the solubility of silver phosphate in phosphoric acid of concentrations within the range of 50 to 85%. Referring to the curve, it is to be noted that solutions containing, for example, 20% of silver phosphate in phosphoric acid of 65% concentration are unstable. However, it is recognized that supersaturated solutions may be prepared which contain higher concentrations of silver phosphate than indicated by the curve, and it is intended that such supersaturated solutions are comprised within the scope of the present invention, although, in general, the supersaturated solutions are not as preferable because of their instability.

It is believed that the silver phosphate reacts with the phosphoric acid to yield silver acid phosphate and that this acid phosphate is probably the effective constituent of our separating agent. This reaction may be represented by the following equation:

However, this has not been conclusively demonstrated and we do not wish to limit ourselves to the above explanation.

The silver phosphate-phosphoric acid solution may be prepared in any suitable manner. One convenient method of preparation is to mix the required amount of silver phosphate in a concentrated phosphoric acid solution and then add the necessary amount of water in order to yield a separating agent of the desired concentration. On the other hand, the phosphoric acid may be diluted prior to admixture of the silver phosphate.

In place of, or in addition to, silver phosphate, other salts of silver may be used, but not necessarily with equivalent results. Silver phosphate is preferred in the present invention. Silver oxide or carbonate may be used, either alone or in admixture with silver phosphate. Although the nitrate may likewise be used, care must be employed in order to avoid the formation of explosive fulminates. Similarly, other salts of silver, such as the acetate, fluoride, sulfate, etc. may be utilized, either alone or in admixture, but not necessarily with equivalent results. When choosing the particular salt to employ, consideration must be given to its solubility in phosphoric acid and to whether excessive decomposition will occur under the conditions of operation to be employed.

The temperature employed in the separation process will depend upon the particular compounds being treated and may range from subatmospheric up to 150° F. or more. In general, the temperature should be below about 150° F. in order to avoid undesired reactions which may occur at higher temperatures. Although atmospheric, subatmospheric or superatmospheric pressures may be employed, it is generaly preferred to employ sufficient superatmospheric pressure in order to maintain the hydrocarbons in substantially liquid phase.

Any suitable type of apparatus may be employed for effecting the desired separation, and this may take the form of a single or multiple stage operation. Batch operations may be effected by contacting the hydrocarbon mixture and separating agent in a vessel which is maintained at the proper temperature and pressure conditions and which preferably is provided with some sort of stirring mechanism. After satisfactory mixing has been accomplished, the mixture may be allowed to settle into an extract and raffinate phase and each of these phases may be separately withdrawn.

Continuous operations are well known in the art at the present time and may take the form of one or more vessels or zones which do or do not contain packing material such as clays, gravel, synthetic materials, etc. and/or fractionating means such as baffle plates, bubble trays, or the like. Either concurrent or countercurrent flow may be employed and the mixture may then be allowed to settle in either the same or different zones in order to separate an extract layer and a raffinate layer. These layers are then separately withdrawn.

After separation of these layers, the hydrocarbons may be recovered from the separating agent by any suitable means. One satisfactory method is by heating to a higher temperature in order to distill the hydrocarbons. However, this method of recovery must not be used when undesired reactions will occur at the higher temperatures, due to the catalytic action exerted by the separating agent. It is in cases of this kind that lower concentrations of phosphoric acid are preferred. Another suitable method of recovering the hydrocarbons from the separating agent is by reducing the pressure of the extract phase, for example, in order to liberate the hydrocarbons. This method may have particular application when the absorption step of the process is conducted under high pressures. In some cases it may be desired to employ both an increased temperature and a reduced pressure in the desorption or recovery stage. Another suitable method is the use of a secondary solvent which is immiscible with the silver phosphate-phosphoric acid solution, in order to dissolve the hydrocarbons in the secondary solvent. The secondary solvent is preferably of either higher or lower boiling range than the hydrocarbons so that the hydrocarbons may be subsequently readily separated therefrom by fractionation means.

The addition of water to the single-phase mixture of hydrocarbons and separating agent will effect the separation of the hydrocarbons and the silver phosphate-phosphoric acid solution. In some cases, it is necessary to subject the separating agent to distillation, preferably under vacuum, to recover the final traces of hydrocarbons therefrom.

It is also within the scope of the invention to recover the hydrocarbons from the separating agent by multiple stage desorption conducted at increasing temperatures and/or decreasing pressures. In this manner, the first portion so desorbed or released will be richer in one type of compound than will be the subsequently desorbed portions.

It is understood, however, that the recited methods of recovering the hydrocarbons from the separating agent will not necessarily be equivalent in their effectiveness and that the choice as to the particular one to be used will depend primarily upon the type of hydrocarbons undergoing treatment.

After separation of the hydrocarbons, the separating agent may of course be recycled to the extraction step for further use therein or, when desired, the separating agent may be utilized for extracting the unsaturated compounds from the raffinate layer or from other hydrocarbon mixtures in the same or different zones.

The following examples are introduced for the purpose of further illustrating the novelty and utility of the present invention but not with the intention of unduly limiting the same.

Example I

A solution comprising 20% silver phosphate in 67.5% phosphoric acid was utilized as the separating agent for the removal of normal butylene from various mixtures of normal butylene and normal butane. By referring to the curve, it is to be noted that this mixture is a supersaturated solution. 50 cc. of the separating agent and 150 cc. of the butylene-butane mixture were employed. From a mixture comprising 13.1% normal butylene and the balance normal butane, 23.5 cc. of the normal butylene were dissolved in the separating agent at 0° C., 19.2 cc. at 30° C., and 16.7 cc. at 60° C. per cc. of separating agent. From a mixture comprising 21.4% normal butylene and the rest normal butane, 37.5 cc. of the normal butylene were dissolved at 0° C., 35.8 cc. were dissolved at 30° C., and 16.6 cc. at 60° C. From a mixture comprising 27.8% normal butylene and the rest normal butane, 39 cc. of the normal butylene were dissolved at 0° C., 37.1 cc. at 30° C., and 31.2 cc. at 40° C.

Example II

A separating agent comprising 30% silver phosphate in 85% phosphoric acid was used in the separation of normal butylene from various mixtures with normal butane. Utilizing a mixture of 14% normal butylene and 86% normal butane, 50.8% of the normal butylene was dissolved at 30° C. From a mixture comprising 24.4% normal butylene and 75.6% normal butane, 66.5% of the normal butylene was dissolved at 30° C.

Example III 100 cc. of a mixture containing 42.3% styrene and 57.7% ethylbenzene were extracted with 100 cc. of a separating agent comprising 30% silver phosphate in 85% phosphoric acid at room temperature and atmospheric pressure. The extract contained 28.3 cc. of hydrocarbons, of which approximately 94% comprised styrene. The raffinate contained 71.7 cc. of hydrocarbons, of which approximately 20.5% comprised styrene. The loss by polymerization was less than one part per thousand. By subjecting the raffinate to further extraction with the separating agent, the styrene recovered may reach 95% or more of the original styrene present in the charge.

Example IV

The following data show the effect of different concentrations of silver phosphate in the extraction of styrene from ethylbenzene. The charging stock comprised a mixture of 42.3% styrene and 57.7% ethylbenzene.

| Weight per cent silver phosphate in 85% phosphoric acid | Cc. of styrene dissolved per 100 cc. silver phosphate solution |
| --- | --- |
| 5 | 6.5 |
| 10 | 11.1 |
| 15 | 16.8 |
| 30 | 26.2 |

Example V 100 cc. of a mixture comprising 22.5% butadiene, 27.7% normal butylene and 49.8% normal butane were shaken with 50 cc. of separating agent comprising 30% silver phosphate in 85% phosphoric acid at room temperature. In this particular example, the mixture was shaken for one hour and the extract phase and raffinate phase were separately withdrawn and analyzed. 29 cc. of unsaturated compounds were dissolved per 100 cc. of the separating agent. The analysis of these products is as follows:

| | Per cent butadiene | Per cent butylene | Per cent butane |
| --- | --- | --- | --- |
| Extract | 64.5 | 33 | 2.5 |
| Raffinate | 13.7 | 28 | 58.3 |

It is understood that the above examples are merely a few of the many which may be submitted to show the value of the present invention and that these examples have been selected on the basis of representing different types and mixtures of compounds and different concentrations of separating agent.

We claim as our invention:

1. A process for the separation of an unsaturated hydrocarbon from a hydrocarbon mixture containing the same which comprises contacting the mixture with a separating agent comprising a silver salt solution in an acid of phosphorus.

2. A process for the separation of an unsaturated hydrocarbon from a hydrocarbon mixture containing the same which comprises contacting the mixture with a separating agent comprising a phosphoric acid solution of silver phosphate.

3. A process for the separation of an unsaturated hydrocarbon from a hydrocarbon mixture containing the same which comprises contacting the mixture with a separating agent comprising silver phosphate dissolved in phosphoric acid of at least 50% concentration.

4. A process for the separation of an unsaturated hydrocarbon from a hydrocarbon mixture containing the same which comprises contacting the mixture with a separating agent comprising a silver acid phosphate.

5. In the separation of olefinic from paraffinic hydrocarbons, the method which comprises contacting a mixture containing said olefinic and paraffinic hydrocarbons with a separating agent comprising a silver salt solution in an acid of phosphorus.

6. In the separation of olefinic from paraffinic hydrocarbons, the method which comprises contacting a mixture containing said olefinic and paraffinic hydrocarbons with a separating agent comprising a silver phosphate solution in phosphoric acid.

7. In the separation of diolefinic from monoolefinic hydrocarbons, the method which comprises contacting a mixture containing said diolefinic and mono-olefinic hydrocarbons with a separating agent comprising a silver salt solution in an acid of phosphorus.

8. In the separation of diolefinic from monoolefinic hydrocarbons, the method which comprises contacting a mixture containing said diolefinic and mono-olefinic hydrocarbons with a separating agent comprising a silver phosphate solution in phosphoric acid.

9. In the separation of vinyl aromatic from alkylated aromatic hydrocarbons, the method which comprises contacting a mixture containing said vinyl aromatic and alkylated aromatic hydrocarbons with a separating agent comprising a silver salt solution in an acid of phosphorus.

10. In the separation of vinyl aromatic from alkylated aromatic hydrocarbons, the method which comprises contacting a mixture containing said vinyl aromatic and alkylated aromatic hydrocarbons with a separating agent comprising a silver phosphate solution in phosphoric acid.

11. A process for removing unsaturated hydrocarbons from a hydrocarbon distillate which comprises contacting said hydrocarbon distillate with a separating agent comprising a silver salt solution in an acid of phosphorus.

12. A process for removing unsaturated hydrocarbons from a hydrocarbon distillate which comprises contacting said hydrocarbon distillate with a separating agent comprising a silver phosphate solution in phosphoric acid.

13. A process for producing a substantially saturated gasoline from an olefin-containing gasoline which comprises contacting said olefin-containing gasoline with a separating agent comprising a silver salt solution in an acid of phosphorus.

14. A process for producing a substantially saturated gasoline from an olefin-containing gasoline which comprises contacting said olefin-containing gasoline with a separating agent comprising a silver phosphate solution in phosphoric acid.

15. A process for the separation of an unsaturated hydrocarbon from a hydrocarbon mixture containing the same which comprises contacting the mixture with a separating agent comprising a silver salt solution in an acid of phosphorus, separating an extract phase, and recovering a major portion of the unsaturated hydrocarbon from the extract phase by the addition of water thereto.

16. A process such as defined in claim 15 wherein the separating agent, remaining after removal of the major portion of the unsaturated hydrocarbon from the extract phase, is subjected to distillation in order to recover the remaining portion of said unsaturated hydrocarbon.

BERNARD S. FRIEDMAN.
RUSSELL F. STEDMAN.